(12) United States Patent
Srinivasan

(10) Patent No.: US 11,499,909 B2
(45) Date of Patent: Nov. 15, 2022

(54) ADJUSTABLE ATMOSPHERIC CORROSION TEST RACK

(71) Applicant: UNIVERSITY OF ALASKA ANCHORAGE, Anchorage, AK (US)

(72) Inventor: Raghu Srinivasan, Anchorage, AK (US)

(73) Assignee: University of Alaska—Anchorage, Anchorage, AK (US)

( * ) Notice: Subject to any disclaimer, the term of this patent is extended or adjusted under 35 U.S.C. 154(b) by 78 days.

(21) Appl. No.: 17/024,088

(22) Filed: Sep. 17, 2020

(65) Prior Publication Data

US 2021/0080376 A1    Mar. 18, 2021

Related U.S. Application Data

(60) Provisional application No. 62/901,586, filed on Sep. 17, 2019.

(51) Int. Cl.
*G01N 17/00* (2006.01)
*G01D 21/02* (2006.01)

(52) U.S. Cl.
CPC ............ *G01N 17/00* (2013.01); *G01D 21/02* (2013.01)

(58) Field of Classification Search
CPC ............... A61G 13/04; A47B 2200/00; A47B 2200/0035; A47B 2200/0036; A47B 2200/004; A47B 2200/0041; A47B 2200/0042; A47B 2200/0043; A47B 2200/0044; A47B 2200/0046; A47B 2200/005; A47B 2200/0051; A47B 2200/0052; A47B 2200/0055; A47B 2200/0063; A47B 2200/0087; A47B 2200/0088; G01N 17/00; G01N 17/006; G01N 17/008; G01N 17/04; G01N 17/046; G01D 21/02; A47F 5/00; A47F 5/12;
(Continued)

(56) References Cited

U.S. PATENT DOCUMENTS 5,172,641 A * 12/1992 Auer .................... A47B 13/081
                                                                     108/5
5,590,796 A *  1/1997 Herman .................. A47F 5/108
                                                                     108/99
(Continued)

FOREIGN PATENT DOCUMENTS

CN        202649089 U  *  1/2013
CN        106680190 A  *  5/2017
(Continued)

OTHER PUBLICATIONS

Wikipedia Contributors. (Aug. 14, 2019). Thermometer. Wikipedia. Retrieved Jan. 24, 2022, from https://web.archive.org/web/20190828222356/https://en.wikipedia.org/wiki/Thermometer (Year: 2019).*

*Primary Examiner* — Daniel R Miller
*Assistant Examiner* — Eric Sebastian Von Wald
(74) *Attorney, Agent, or Firm* — Ballard Spahr LLP

(57) ABSTRACT

An apparatus for testing corrosion can comprise a frame and a rack having a generally planar face, a first edge, and a second edge. The rack can be pivotably coupled to the frame. The apparatus can be configured for selectively orienting the rack to position the first edge of the rack with a select vertical offset with respect to the second edge of the rack.

19 Claims, 5 Drawing Sheets

(58) Field of Classification Search
CPC ...... A47F 5/132; A47F 5/16; A47F 2005/165; A47F 7/0014; A47F 7/0042; A47F 7/0246
See application file for complete search history.

(56) References Cited

U.S. PATENT DOCUMENTS

| | | | | |
|---|---|---|---|---|
| 5,730,068 A | * | 3/1998 | Rioux, Jr. | A47F 5/10 108/3 |
| 2011/0147560 A1 | * | 6/2011 | Camarillo | A47B 13/023 248/371 |

FOREIGN PATENT DOCUMENTS

| | | | |
|---|---|---|---|
| CN | 207114393 U | * | 3/2018 |
| CN | 207300837 U | * | 5/2018 |

* cited by examiner

ADJUSTABLE ATMOSPHERIC CORROSION TEST RACK

CROSS-REFERENCE TO RELATED APPLICATION

This application claims priority to and the benefit of U.S. Provisional Application No. 62/901,583, filed Sep. 17, 2019, the entirety of which is hereby incorporated by reference herein.

FIELD

This application relates to devices, systems, and methods for testing corrosion.

BACKGROUND

Corrosion effects can be critical when designing materials, components, and articles for various environments. Accordingly, it can be desirable to test materials in such environments.

SUMMARY

Described herein, in various aspects, is an apparatus for testing corrosion. The apparatus can comprise a frame and a rack having a generally planar face, a first edge, and an opposing second edge. The rack can be pivotably coupled to the frame. The apparatus can be configured for selectively orienting the rack to position the first edge of the rack with a select vertical offset with respect to the second edge of the rack.

The apparatuses in accordance with embodiments disclosed herein can be modular and adjustable. In some aspects, the apparatuses can be used in atmospheric corrosion tests. The apparatuses can be installed in a location to simulate a select environment, such as, for example, on the roof of a parking garage. In some optional aspects, the racks can be 46 in by 46 in (1,168.4 mm by 1,168.4 mm) and can be adjusted to three different angles (0°, 30°, 45° to the horizontal), which can approximate different surfaces of a car hood. The angle of exposure can affect the snow/ice retention, which can lead to the formation of varying thicknesses of moisture on metal surface. The angle of exposure can also affect the wash off from rain, and this can affect the atmospheric corrosion mechanisms. This apparatus disclosed herein can helps in identifying the weather parameters by isolating the corrosion inducing variables and their primary effect on corrosion in extreme cold climates.

DETAILED DESCRIPTION

Figure 1:
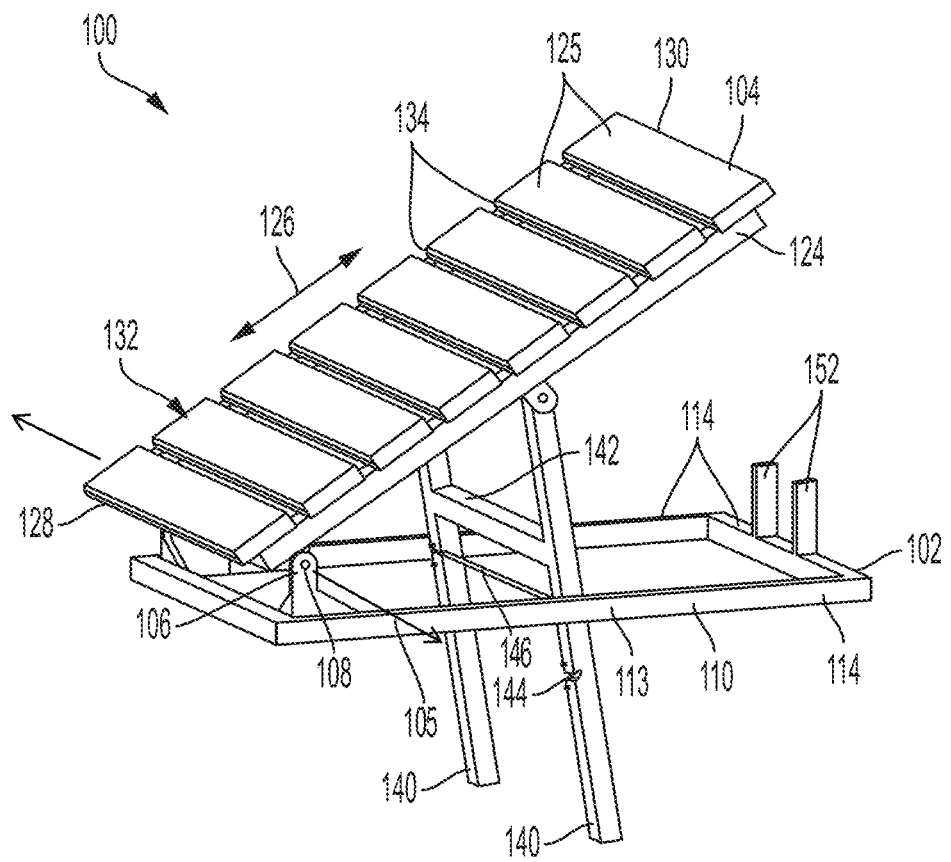
FIG. 1 is a perspective view of an assembly comprising a rack and an upper portion of a frame in accordance with embodiments disclosed herein.
Figure 2:
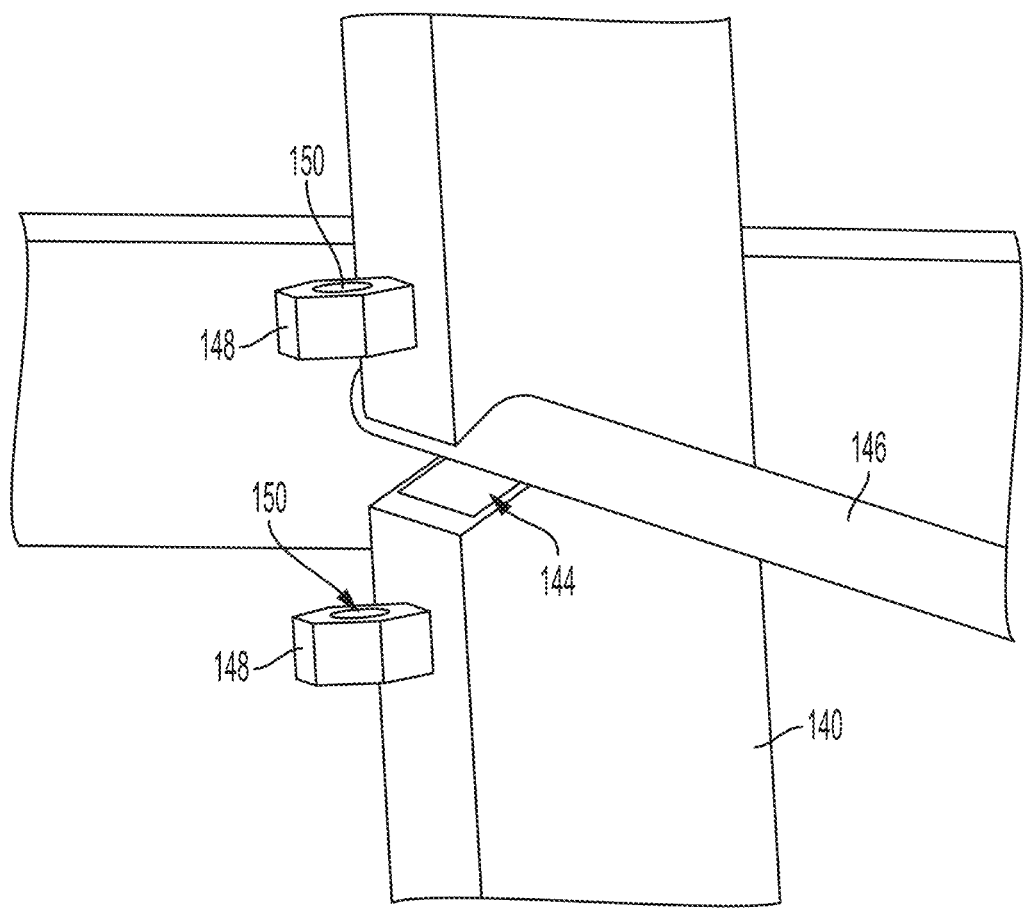
FIG. 2 is a close-up perspective view of the assembly in FIG. 1, showing detail of a retainer for selecting an angle of the rack.

The present invention now will be described more fully hereinafter with reference to the accompanying drawings, in which some, but not all embodiments of the invention are shown. Indeed, this invention may be embodied in many different forms and should not be construed as limited to the embodiments set forth herein; rather, these embodiments are provided so that this disclosure will satisfy applicable legal requirements. Like numbers refer to like elements throughout. It is to be understood that this invention is not limited to the particular methodology and protocols described, as such may vary. It is also to be understood that the terminology used herein is for the purpose of describing particular embodiments only, and is not intended to limit the scope of the present invention.

Many modifications and other embodiments of the invention set forth herein will come to mind to one skilled in the art to which the invention pertains having the benefit of the teachings presented in the foregoing description and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

As used herein the singular forms "a", "an," and "the" include plural referents unless the context clearly dictates otherwise. For example, use of the term "a rack" can refer to one or more of such racks.

All technical and scientific terms used herein have the same meaning as commonly understood to one of ordinary skill in the art to which this invention belongs unless clearly indicated otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

As used herein, the terms "optional" or "optionally" mean that the subsequently described event or circumstance may or may not occur, and that the description includes instances where said event or circumstance occurs and instances where it does not.

The word "or" as used herein means any one member of a particular list and also includes any combination of members of that list.

The following description supplies specific details in order to provide a thorough understanding. Nevertheless, the skilled artisan would understand that the apparatus and associated methods of using the apparatus can be implemented and used without employing these specific details. Indeed, the apparatus and associated methods can be placed into practice by modifying the illustrated apparatus and associated methods and can be used in conjunction with any other apparatus and techniques conventionally used in the industry.

The corrosion behavior of a material or a component can be evaluated by service history, field tests, or accelerated corrosion tests. The service history predicts the system's life more accurately, followed by field tests and accelerated laboratory tests. But time and budget constraints make service history and field tests almost impossible for material selection and evaluation. Apparatuses as disclosed herein can help testing material exposed to different angles, which in turn helps predicting actual service life more accurately than the accelerated corrosion tests.

In general, the environment can be categorized as rural, urban, industrial, and marine based on the corrosion rates of exposed samples and atmospheric conditions. The most common assumption is that there is very little to no corrosion in arctic and cold environments. However, previous studies in Antarctic and Arctic regions have dispelled that notion, and the corrosion rates are substantial. The atmospheric corrosion damage in cold environments is close to the main human activity, which is concentrated close to the sea/coastal areas. Previous studies in the subarctic regions of Canada, Norway, and Russia show extensive atmospheric corrosion rates (when compared to Antarctica) due to the human developments and the resulting increase in mining and metallurgical industries. Experimental and theoretical work has shown that the electrochemical process proceeds at temperatures as low as −25° C. to −20° C. Winds can bring in salt-laden snow from the marine environment, and the use of deicing salts can also contribute to high levels of chlorides. With the combination of critical relative humidity, the time of wetness (TOW) of the metal samples will be high, thus extensive atmospheric corrosion damages are observed. Another factor that contributes to high corrosion rates is low rainfall, which in turn cannot periodically wash off the deposited chloride on top of the samples. The long hours of sunlight in the summer increase the surface temperature of the metal samples compared to the ambient temperatures and this can melt the snow/ice. The temperature of the samples is not too high to evaporate the snow/ice deposited but high enough to melt the snow/ice and keep the samples wet for longer periods of time. In addition, the ever-increasing ambient temperatures due to global warming in recent years affect the presence of snow on top of the metal samples. This leads to the formation of varying thicknesses of wet ice/snow layers on the metal surface. The combination of urbanization and proximity to marine environments make artic and sub-arctic regions in North America an important natural laboratory to study atmospheric corrosion. However, very little corrosion data is available in cold climates. Apparatuses as disclosed herein can be used in cold climates to study the snow retention on top of metal samples as a function of exposure angles and the effect of snow retention on atmospheric corrosion. This can be added to the existing standard to test materials at different exposure angles.

Disclosed herein, in various aspects and with reference to FIGS. 1-4, is corrosion test apparatus 100. The test apparatus 100 can be used to test atmospheric exposure effects on materials at various angles with respect to the horizontal and at various cardinal orientations. It is contemplated that the angle of the material can affect retention of snow and ice that can lead to formation of different thicknesses of moisture on surfaces (e.g., metal surfaces). The angle can further affect the wash off from rain, which can change corrosion mechanisms. Accordingly, it is contemplated that the test apparatus 100 as disclosed herein can enable a user to isolate variables that lead to corrosion, as well as the effect of said variables on material corrosion in certain environments (e.g., extreme cold climates). Further, it is contemplated that the test apparatus 100 as disclosed herein can maintain the test specimens at a select height above a reference surface (e.g., at least 30 inches above the ground).

The apparatus 100 can comprise a frame 102 and a rack 104 that is pivotably coupled to the frame 102 via a hinge 106. The rack 104 can be pivotably coupled to the frame 102 about a pivot axis 105 (optionally, a horizontal pivot axis). Optionally, the hinge 106 can comprise a pin 108 that extends through both the frame 102 and the rack 104 on each side of the rack.

Figure 3:
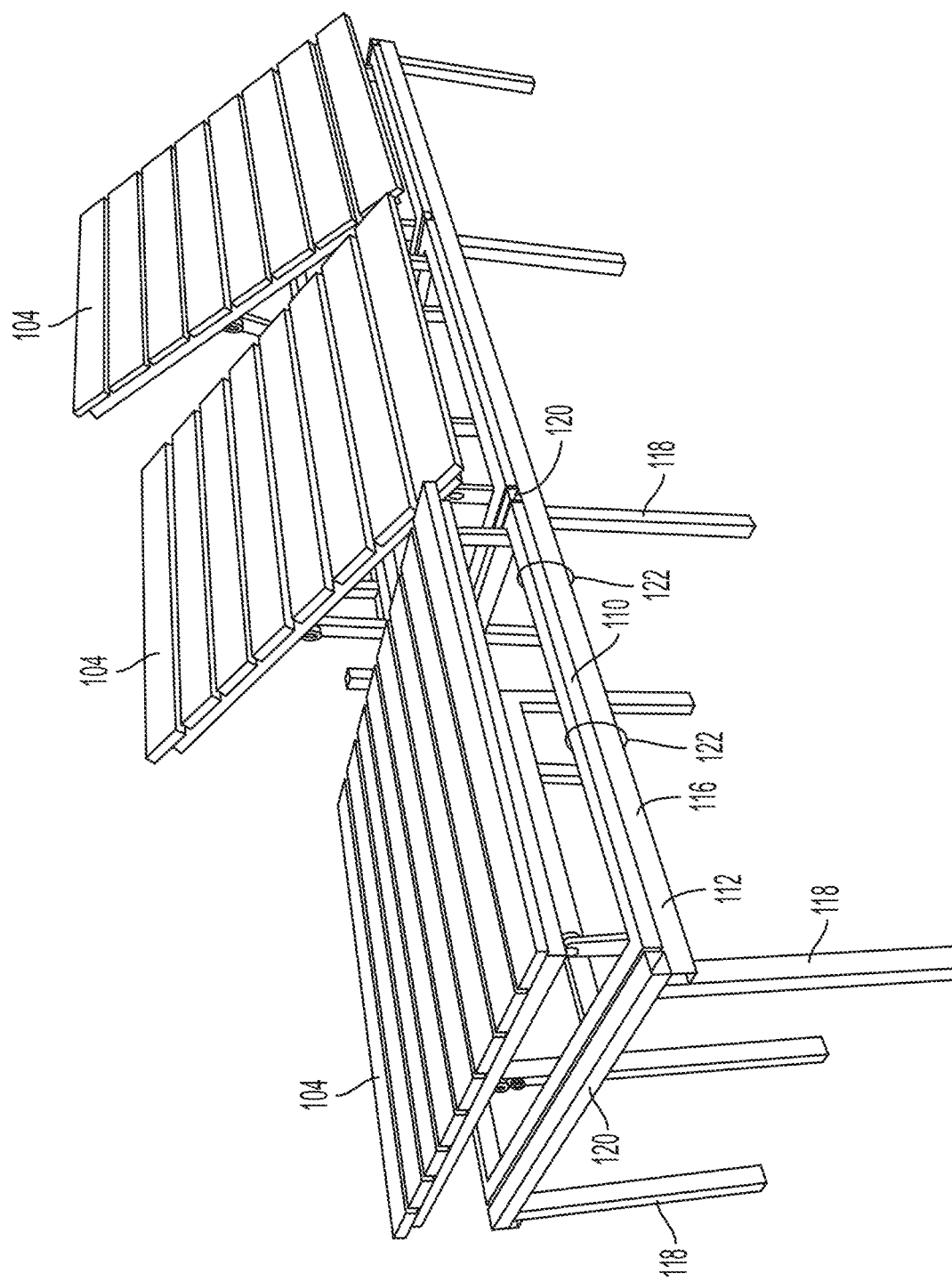
FIG. 3 is a perspective view of an apparatus comprising a lower portion of a frame and a plurality of assemblies as in FIG. 1.

In some aspects, and with reference to FIGS. 1 and 3, the frame 102 can comprise an upper portion 110 and a lower portion 112. The upper portion 110 of the frame 102 can comprise a base portion 113 having at least one base member 114 that defines a perimeter of the base portion. For example, the at least one base member 114 can comprise a plurality of base members 114 (e.g., four base members) that are coupled together in a rectangular arrangement. Optionally, the base portion 113 can be square and have a side length. The lower portion 112 of the frame 102 can comprise a base 116 that is supported by a plurality of vertical legs 118 that space the base 116 from the ground. The base 116 can define an upper surface upon which the upper portion 110 of the frame can rest. A pair of horizontal rails 120 can extend parallel to each other above the upper surface of the base 116 of the lower portion of the frame, with the rails being connected to opposing front and rear portions of the base 116. The rails can be spaced by the side length of the base 113 plus a small clearance (e.g., ½ inch or 1 inch) to receive the base portion 113 of the upper portion 110 of the frame 102 therebetween. In this way, the rails 120 can restrict lateral movement of the upper portion. In exemplary aspects, it is contemplated that each respective end of the rails 120 can be secured to the base 116 at a location proximate a respective vertical leg 118. It is contemplated that a square arrangement of base members 114 can enable the upper portion 110 of the frame to engage the lower portion 112 of the frame in four different arrangements that are angularly offset by 90 degrees (e.g., facing North, South, East, and West). In this way, the rack 104 can be adjusted to test materials at various orientations with respect to the cardinal directions. The upper portion and lower portion can further be coupled together with fasteners 122 (e.g., zip ties, bands, screws, etc.).

Optionally, in exemplary aspects, the rack 104 can comprise a plurality of slats 125 that are coupled to at least one support member 124 (optionally, two or more parallel support members 124) and spaced along the at least one support member 124 and relative to a first axis 126. The rack 104 can have a first edge 128 and an opposing second edge 130 that are spaced relative to the first axis 126. Optionally, the slats 125 can cooperatively define a planar or generally planar upper surface 132. More generally, the rack 104 (optionally, the slats 125) can define an upper surface having any suitable shape (for example, a planar, arcuate, beveled, tapered, or complex/variable profile) to mimic a material to be tested (e.g., a contour of at least a portion of an automobile hood). Optionally, the slats 125 can be spaced to have gaps 134 therebetween (along the first axis 126). The gaps 134 can optionally be less than 1 inch wide or less than ½ inch wide. The gaps 134 can enable easy removal and replacement of individual slats 125 without adjacent slats interfering with the removal and replacement. Optionally, the upper surface of the rack 104 can have dimensions of about 46 inches by 46 inches. In various aspects, the upper surface of the rack 104 can have dimensions of greater than 40 inches by greater than 40 inches. In further aspects, the upper surface of the rack 104 can have dimensions of less than 24 inches by less than 24 inches. More generally, it is contemplated that any selected dimensions can be used.

Although the upper surface of the rack 104 is shown having a square profile, it is contemplated that alternative configurations (e.g., rectangular configurations) can be used in which the side dimensions of the rack are not equal to the front and/or rear dimensions. In some aspects, the slats 125 can be rigid.

As shown in FIG. 3, the apparatus 100 can be configured for selectively orienting the rack to position the second edge 130 of the rack with a select vertical offset with respect to the first edge 128 of the rack 104. Alternatively, the configuration can be reversed from what is shown in FIG. 3, with the first edge 128 being positioned at a select vertical offset with respect to the second edge 130. The positioning of the first and/or second edge can result from pivoting of the rack relative to the hinge 106, which can be placed proximate either the first edge 128 or the second edge 130. In this way, the rack can be set so that the upper surface 132 is at a select angle with respect to a horizontal plane (e.g., 0 degrees, 30 degrees, or 45 degrees). These angles can approximate various surfaces of objects that are exposed to elements and moisture outdoors (e.g., automobile surfaces).

In some aspects, at least one arm 140 (e.g., two arms 140, as shown) can be pivotably coupled to the rack 104. Optionally, a transverse reinforcement arm 142 can extend between and couple to the two arms 140. Each of the arms 140 can comprise one or more catches 144 (e.g., notches or hooks) that are configured to engage a cross bar 146 that extends between opposing sides of the base portion 113. The catches 144 can be spaced along the length of the respective arms so that when the catches 144 receive the cross bar 146, the rack 104 is held at a select angle with respect to the horizontal plane. Optionally, the arms can comprise cutouts that define the catches 144. In these aspects, it is contemplated that a reinforcement plate can be coupled to the arms 142 at the catches 144 so that the arms 140 can bear sufficient loads. In further aspects, the catches 144 can be welded to, and extend from, the arms 142. The catches 144 can be configured to receive the cross bar 146 so that, absent an external force, the cross bar 146 can be retained with the respective catches 144. Further, a pair of projecting tabs 148 on opposing sides of each catch 144 can define through-holes 150 that can be configured to simultaneously receive a retaining pin (not shown) to retain the cross bar 146 within each catch 144.

Optionally, at least one backstop 152 (e.g., a pair of backstops 152, as shown) can extend upwardly from the base portion 113 of the upper portion 110 of the frame 102. The backstops 152 can be configured to engage a portion of the rack (e.g., a portion of at least one support member 124 and/or a bottom surface of one or more slats 125) to hold the rack parallel to the horizontal plane. In this configuration, it is contemplated that the upper surface of the rack 104 can be 30 inches or more than 30 inches above the ground (or other surface upon which the apparatus 100 rests).

The apparatus 100 can comprise corrosion-resistant materials, such as, for example, stainless steel or 4130 steel (ASTM A519), which can beneficially be corrosion resistant and weldable. Further, some or all of the apparatus 100 can be powder coated to resist corrosion. The slats can optionally comprise composite decking material, such as deck boards (e.g., TREX boards). It is contemplated that such slats can enable dismantling and reassembling for transport. For example, screws or other fasteners that couple the rack to the frame can be removed and replaced in a different location. Further, it is contemplated that the slats can be periodically replaced. It is contemplated that some or all of the apparatus 100 can be configured to resist corrosion for ten years. It is contemplated that the apparatus 100 can be configured to support a load of at least 750 pounds or more. Thus, for example, in some optional aspects it is contemplated that 18 inches of packed snow covering the entire top surface can weigh about 660 pounds, allowing for 90 pounds of samples. In some aspects, one or more of the frame components (e.g., base members 114), rack components (e.g., support members 124), and arms 140 can comprise channel tubing (e.g., square tubing). Optionally, the cross bar 146 can have a diameter of about ½ inch.

Although disclosed herein as starting at a horizontal orientation, it is contemplated that the pivotal movement of the rack can also occur relative to other axes, such as, for example, and without limitation, a vertical axis. In such embodiments, it is contemplated that the frame can oriented vertically or at a different angle that permits desired movement of the rack. In such embodiments, it is further contemplated that the frame can be secured or coupled to a vertically extending surface (or other structure) to retain the frame in a desired position (and address gravitational forces).

Figure 4:
FIG. 4 shows an image of the apparatus as shown in FIG. 3 with snow accumulated thereon.

Optionally, as shown in FIGS. 3-4, the apparatus 100 can comprise a plurality of racks that are independently selectively pivotable to select (optionally, different) angular positions. In some aspects, the apparatus can comprise a lower frame portion 112 that receives and supports a plurality of upper frame portions 110 that are coupled to respective racks 104.

It is contemplated that the time of wetness and chloride deposition are the two main parameters for atmospheric corrosion testing and these variables can depend on the angle of exposure. As disclosed herein, the test apparatus 100 can be modular and adjustable to allow changing the direction of exposure (north, south, east or west) and the angle of exposure (0, 30, 45-degrees to horizontal). These changes can be made relatively easily and saves time of designing further for exposure angles and direction.

The apparatus 100 can be used to perform various corrosion tests, including, for example: ASTM G 50-76 (Reapproved 2003) describing the standard practice for conducting atmospheric corrosion tests on metals; ASTM G4-01 (Reapproved 2014) describing the standard practice for conducting corrosion tests in field applications; and ASTM G 92-86 (Reapproved 2003), characterizing standard practice for atmospheric test sites.

Figure 5:
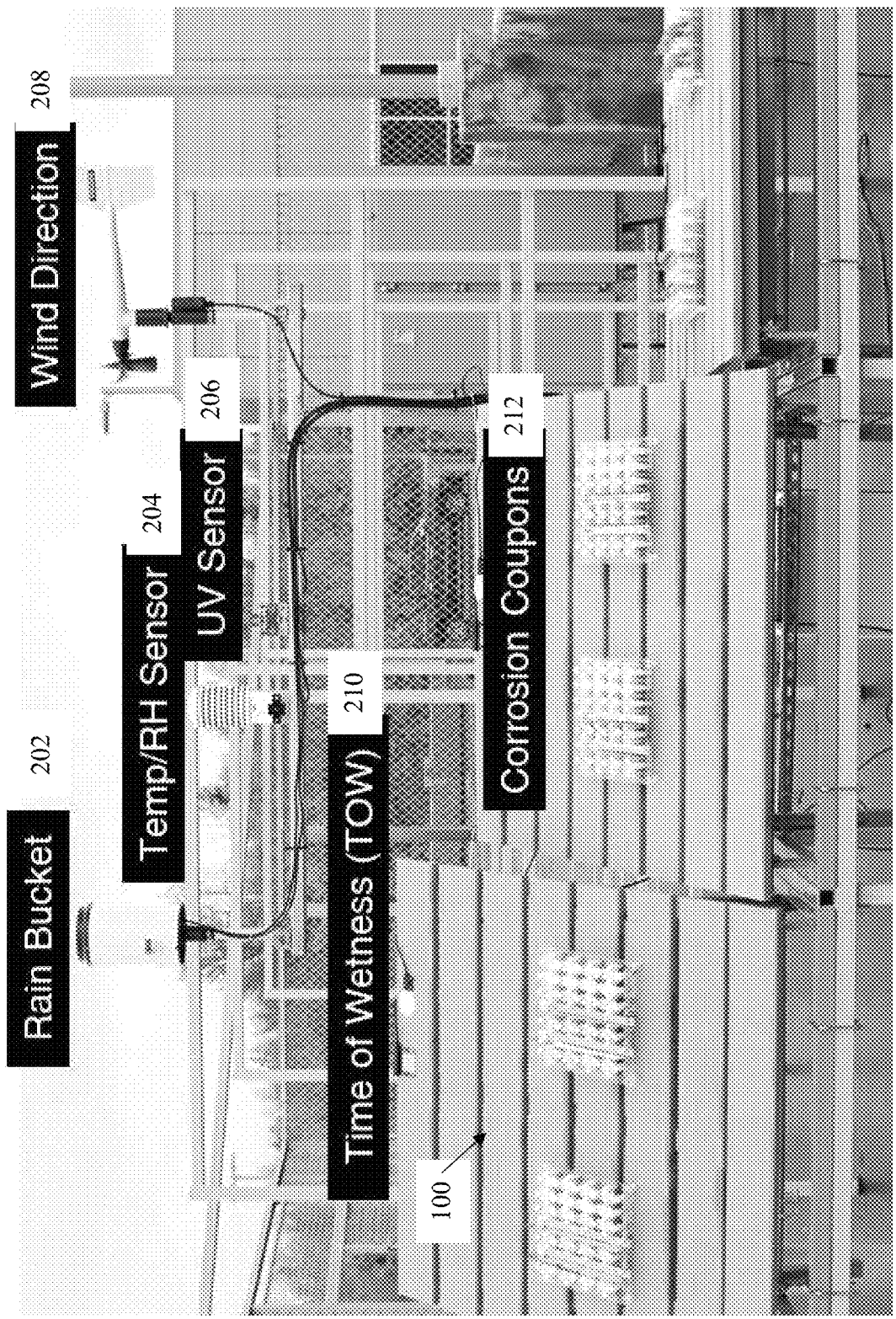
FIG. 5 shows an image of the apparatus as shown in FIG. 3 with samples positioned thereon.

The apparatus can be used according to various optional methods. One optional method can comprise positioning the rack at a select angle. The rack can be rotated so that the top surface of the rack is at least partially facing in a select cardinal direction. A material can be placed on the rack. For example, the material can be placed on test boards as shown in FIG. 5. The test boards can be coupled to the rack (e.g., via wood screws that extend into the slats. The material can be left on the rack for a predetermined amount of time or until a predetermined amount of exposure (e.g., a select number of days after precipitation) has occurred. The material can then be inspected. Optionally, a plurality of materials that can optionally be the same material or different materials can be tested simultaneously. Optionally, features, such as corrosion of the plurality of materials, can be compared.

In various aspects, various environmental exposures can be tracked. For example, a system 200 can comprise at least one apparatus 100 and one or more of the following: a rain bucket 202 for quantifying precipitation, a temperature sensor 204, an ultraviolet sensor 206, a wind direction sensor 208, and a time of wetness sensor 210. Materials 212 for testing can be coupled to the rack.

Various materials can be tested using embodiments of the apparatus, such as, for example, magnesium and magnesium alloys.

Exemplary Aspects

In view of the described products, systems, and methods and variations thereof, herein below are described certain more particularly described aspects of the invention. These particularly recited aspects should not however be interpreted to have any limiting effect on any different claims containing different or more general teachings described herein, or that the "particular" aspects are somehow limited in some way other than the inherent meanings of the language literally used therein.

Aspect 1: An apparatus comprising: a frame; and a rack having a generally planar face, a first edge, and an opposing second edge that is spaced from the first edge along a first axis, wherein the rack is pivotably coupled to the frame about a horizontal pivot axis, wherein the rack is pivotable about and between at least a horizontal orientation and an angled orientation that provides a select vertical offset between the first and second edges of the rack, wherein in the horizontal orientation, the first axis is substantially perpendicular to the horizontal pivot axis.

Aspect 2: The apparatus of aspect 1, further comprising at least one arm that is pivotably coupled to the rack, wherein the at least one arm comprises at least one catch that is configured to receive a portion of the frame to support the rack so that the first edge of the rack has the select vertical offset with respect to the second edge of the rack.

Aspect 3: The apparatus of aspect 2, wherein the frame comprises a cross bar, wherein the at least one arm comprises a first arm and a second arm that are positioned on opposing sides of the rack, wherein each catch of the first arm is configured to cooperate with a corresponding catch of the second arm to receive the cross bar.

Aspect 4: The apparatus of any one of the preceding aspects, wherein the apparatus is configured for selectively orienting the generally planar face at each of a horizontal orientation that is parallel to a horizontal plane, a first angled orientation that is at a first acute angle with respect to the horizontal plane, and a second angled orientation that is at a second acute angle with respect to the horizontal plane.

Aspect 5: The apparatus of aspect 4, wherein the first acute angle is between 5 degrees and 40 degrees, and the second acute angle is between 35 degrees and 60 degrees.

Aspect 6: The apparatus of aspect 5, wherein the first acute angle is about 30 degrees, and the second acute angle is about 45 degrees.

Aspect 7: The apparatus of any one of aspects 2-6, wherein the at least one arm defines at least one notch, wherein the catch comprises the at least one notch.

Aspect 8: The apparatus of any one of the preceding aspects, wherein the frame comprises a lower portion and an upper portion that is selectively positionable with respect to the lower portion in a first frame orientation and a second frame orientation that is angularly offset from the first orientation with respect to a vertical axis.

Aspect 9: The apparatus of aspect 8, wherein upper portion of the frame is selectively positionable with respect to the lower portion of the frame in at least four angularly equally spaced orientations.

Aspect 10: The apparatus of aspect 8 or aspect 9, wherein the upper portion of the frame is receivable into the lower portion of the frame.

Aspect 11: The apparatus of aspect 10, wherein the upper portion defines a square base having a side length, wherein the lower portion comprises a pair of rails that are spaced by the side length plus a clearance, wherein the square base of the upper portion is receivable between the pair of rails of the lower portion.

Aspect 12: The apparatus of any one of the preceding aspects, wherein the frame is configured to support a weight of at least 750 pounds.

Aspect 13: The apparatus of any one of the preceding aspects, wherein the rack has an upper surface having dimensions of at least 40 inches by at least 40 inches.

Aspect 14: The apparatus of any one of aspects 1-12, wherein the rack has an upper surface having dimensions of less than 24 inches by less than 24 inches Aspect 15: The apparatus of any one of the preceding aspects, wherein the rack comprises a plurality of rigid slats having spaces therebetween, wherein the plurality of rigid slats cooperate to define the generally planar face of the rack.

Aspect 16: A method comprising: placing a material sample on the rack of an apparatus of any one of the preceding aspects; and analyzing a change in the material after a select amount of time.

Aspect 17: The method of aspect 16, further comprising: adjusting the rack so that the generally planar face of the rack is retained at a select angle with respect to a horizontal plane.

Aspect 18: The method of aspect 16 or aspect 17, further comprising rotating the rack about a vertical axis to orient the rack at a select angle with respect to a cardinal direction.

Aspect 19: A system comprising: an apparatus as recited in any one of aspects 1-15; and at least one sensor that is configured to detect an exposure of the rack to a respective environmental element, where the at least one sensor comprises at least one of: a rain bucket, a temperature sensor, an ultraviolet sensor, a wind direction sensor, or a time of wetness sensor.

Although the foregoing invention has been described in some detail by way of illustration and example for purposes of clarity of understanding, certain changes and modifications may be practiced within the scope of the appended claims.

What is claimed is:

1. An apparatus comprising:
a frame;
a rack having a generally planar face, a first edge, and an opposing second edge that is spaced from the first edge along a first axis, wherein the rack is pivotably coupled to the frame about a horizontal pivot axis, wherein the rack is pivotable about and between at least a horizontal orientation and an angled orientation that provides a select vertical offset between the first and second edges of the rack, wherein in the horizontal orientation, the first axis is substantially perpendicular to the horizontal pivot axis, wherein the rack is configured to support a material sample; and
at least one arm that is pivotably coupled to the rack, wherein the at least one arm comprises at least one notch that is configured to receive a portion of the frame to support the rack so that the first edge of the rack has the select vertical offset with respect to the second edge of the rack,
wherein the frame comprises a lower portion and an upper portion that is selectively positionable with respect to the lower portion in a first frame orientation and a second frame orientation that is angularly offset from the first frame orientation with respect to a vertical axis to permit testing of atmospheric exposure effects on the material sample at various orientations.

2. The apparatus of claim 1, wherein the frame comprises a cross bar, wherein the at least one arm comprises a first arm and a second arm that are positioned on opposing sides of the rack, wherein each notch of the at least one notch of the first arm is configured to cooperate with a corresponding notch of the at least one notch of the second arm to receive the cross bar.

3. The apparatus of claim 1, wherein the apparatus is configured for selectively orienting the generally planar face at each of a horizontal face orientation that is parallel to a horizontal plane, a first angled face orientation that is at a first acute angle with respect to the horizontal plane, and a second angled face orientation that is at a second acute angle with respect to the horizontal plane.

4. The apparatus of claim 3, wherein the first acute angle is between 5 degrees and 40 degrees, and the second acute angle is between 35 degrees and 60 degrees.

5. The apparatus of claim 4, wherein the first acute angle is about 30 degrees, and the second acute angle is about 45 degrees.

6. The apparatus of claim 1, wherein the upper portion of the frame is selectively positionable with respect to the lower portion of the frame in at least four angularly equally spaced orientations.

7. The apparatus of claim 1, wherein the upper portion of the frame is receivable into the lower portion of the frame.

8. The apparatus of claim 7, wherein the upper portion defines a square base having a side length, wherein the lower portion comprises a pair of rails that are spaced by the side length plus a clearance, wherein the square base of the upper portion is receivable between the pair of rails of the lower portion.

9. The apparatus of claim 1, wherein the frame is configured to support a weight of at least 750 pounds.

10. The apparatus of claim 1, wherein the rack has an upper surface having dimensions of at least 40 inches by at least 40 inches.

11. The apparatus of claim 1, wherein the rack has an upper surface having dimensions of less than 24 inches by less than 24 inches.

12. The apparatus of claim 1, wherein the rack comprises a plurality of rigid slats having spaces therebetween, wherein the plurality of rigid slats cooperate to define the generally planar face of the rack.

13. A method comprising:
placing a material sample on a rack of an apparatus, the rack having a generally planar face, a first edge, and an opposing second edge that is spaced from the first edge along a first axis, the apparatus further comprising:
a frame, wherein the rack is pivotably coupled to the frame about a horizontal pivot axis, wherein the rack is pivotable about and between at least a horizontal orientation and an angled orientation that provides a select vertical offset between the first and second edges of the rack, wherein in the horizontal orientation, the first axis is substantially perpendicular to the horizontal pivot axis; and
at least one arm that is pivotably coupled to the rack, wherein the at least one arm comprises at least one notch that is configured to receive a portion of the frame to support the rack so that the first edge of the rack has the select vertical offset with respect to the second edge of the rack,
wherein the frame comprises a lower portion and an upper portion that is selectively positionable with respect to the lower portion in a first frame orientation and a second frame orientation that is angularly offset from the first frame orientation with respect to a vertical axis to permit testing of atmospheric exposure effects on the material sample at various orientations; and analyzing a change in the material sample after a select amount of time.

14. The method of claim 13, further comprising: adjusting the rack so that the generally planar face of the rack is retained at a select angle with respect to a horizontal plane.

15. The method of claim 13, further comprising rotating the rack about a vertical axis to orient the rack at a select angle with respect to a cardinal direction.

16. A system comprising:
an apparatus having:
a frame;
a rack having a generally planar face, a first edge, and an opposing second edge that is spaced from the first edge along a first axis, wherein the rack is pivotably coupled to the frame about a horizontal pivot axis, wherein the rack is pivotable about and between at least a horizontal orientation and an angled orientation that provides a select vertical offset between the first and second edges of the rack, wherein in the horizontal orientation, the first axis is substantially perpendicular to the horizontal pivot axis, wherein the rack is configured to support a material sample; and
at least one arm that is pivotably coupled to the rack, wherein the at least one arm comprises at least one notch that is configured to receive a portion of the frame to support the rack so that the first edge of the rack has the select vertical offset with respect to the second edge of the rack,
wherein the frame comprises a lower portion and an upper portion that is selectively positionable with respect to the lower portion in a first frame orientation and a second frame orientation that is angularly offset from the first frame orientation with respect to a vertical axis to permit testing of atmospheric exposure effects on the material sample at various orientations; and
at least one sensor that is configured to detect an exposure of the rack to a respective environmental element, where the at least one sensor comprises at least one of: a rain bucket, a temperature sensor, an ultraviolet sensor, a wind direction sensor, or a time of wetness sensor.

17. An apparatus comprising:
a frame comprising a lower portion and an upper portion that is selectively positionable with respect to the lower portion in a first frame orientation and a second frame orientation that is angularly offset from the first frame orientation with respect to a vertical axis, wherein the upper portion of the frame is receivable into the lower portion of the frame, wherein the upper portion defines a square base having a side length, wherein the lower portion comprises a pair of rails that are spaced by the side length plus a clearance, wherein the square base of the upper portion is receivable between the pair of rails of the lower portion; and
a rack having a generally planar face, a first edge, and an opposing second edge that is spaced from the first edge along a first axis, wherein the rack is pivotably coupled to the frame about a horizontal pivot axis, wherein the rack is pivotable about and between at least a horizontal orientation and an angled orientation that provides a select vertical offset between the first and second edges of the rack, wherein in the horizontal orientation, the first axis is substantially perpendicular to the horizontal pivot axis, wherein the rack is configured to support a material sample, and wherein the frame and the rack are configured to permit testing of atmospheric exposure effects on the material sample at various orientations.

18. The apparatus of claim 17, further comprising at least one arm that is pivotably coupled to the rack, wherein the at least one arm comprises at least one notch that is configured to receive a portion of the frame to support the rack so that the first edge of the rack has the select vertical offset with respect to the second edge of the rack.

19. The apparatus of claim 18, wherein the frame comprises a cross bar, wherein the at least one arm comprises a first arm and a second arm that are positioned on opposing sides of the rack, wherein each notch of the at least one notch of the first arm is configured to cooperate with a corresponding notch of the at least one notch of the second arm to receive the cross bar.

\* \* \* \* \*